United States Patent [15] 3,685,684
Schindler et al. [45] Aug. 22, 1972

[54] PLASTICS BOX FOR MAGNETIC RECORDING MEDIA IN TAPE FORM, PARTICULARLY REELS OF MAGNETIC TAPE

[72] Inventors: Robert Schindler, Baden-Baden; Kurt Schmidts, Willstaett; Wolfgang Wiegel, Kirchheim, all of Germany

[73] Assignee: Badische Anilin- & Soda-Fabrik Aktiengesellschaft, Ludwigshafen/Rhein, Germany

[22] Filed: June 5, 1970

[21] Appl. No.: 43,791

[30] Foreign Application Priority Data

June 9, 1969 Germany.........G 69 22 910.3

[52] U.S. Cl. .................220/60 R, 206/1 R, 220/31 S
[51] Int. Cl. ...........................................B65d 43/16
[58] Field of Search..........206/1 R, 52 R, 52 F, 62 P; 220/60 R, 31 S, 31 R; 229/2.5, 45, 43, 62, 65

[56] References Cited

UNITED STATES PATENTS

| | | | |
|---|---|---|---|
| 3,348,668 | 10/1967 | Amatsu et al. | 206/52 F |
| 3,256,892 | 6/1966 | Esposito, Jr. | 206/56 R |
| 3,164,478 | 1/1965 | Bostrom | 229/2.5 |
| 3,394,838 | 7/1968 | Larkin | 220/60 |
| 2,974,842 | 3/1961 | Reifers | 229/45 |

*Primary Examiner*—William T. Dixson, Jr.
*Attorney*—Johnston, Root, O'Keeffe, Keil, Thompson & Shurtleff

[57] ABSTRACT

A closable container in the form of a one-piece plastics molding serving as an archive box for magnetic recording media in tape form which, without additional packaging, can be sent by post, narrow and wide ribs in its interior being appropriately dimensioned for the reception of a compact cassette or a reel of tape 3 in. in diameter.

5 Claims, 3 Drawing Figures

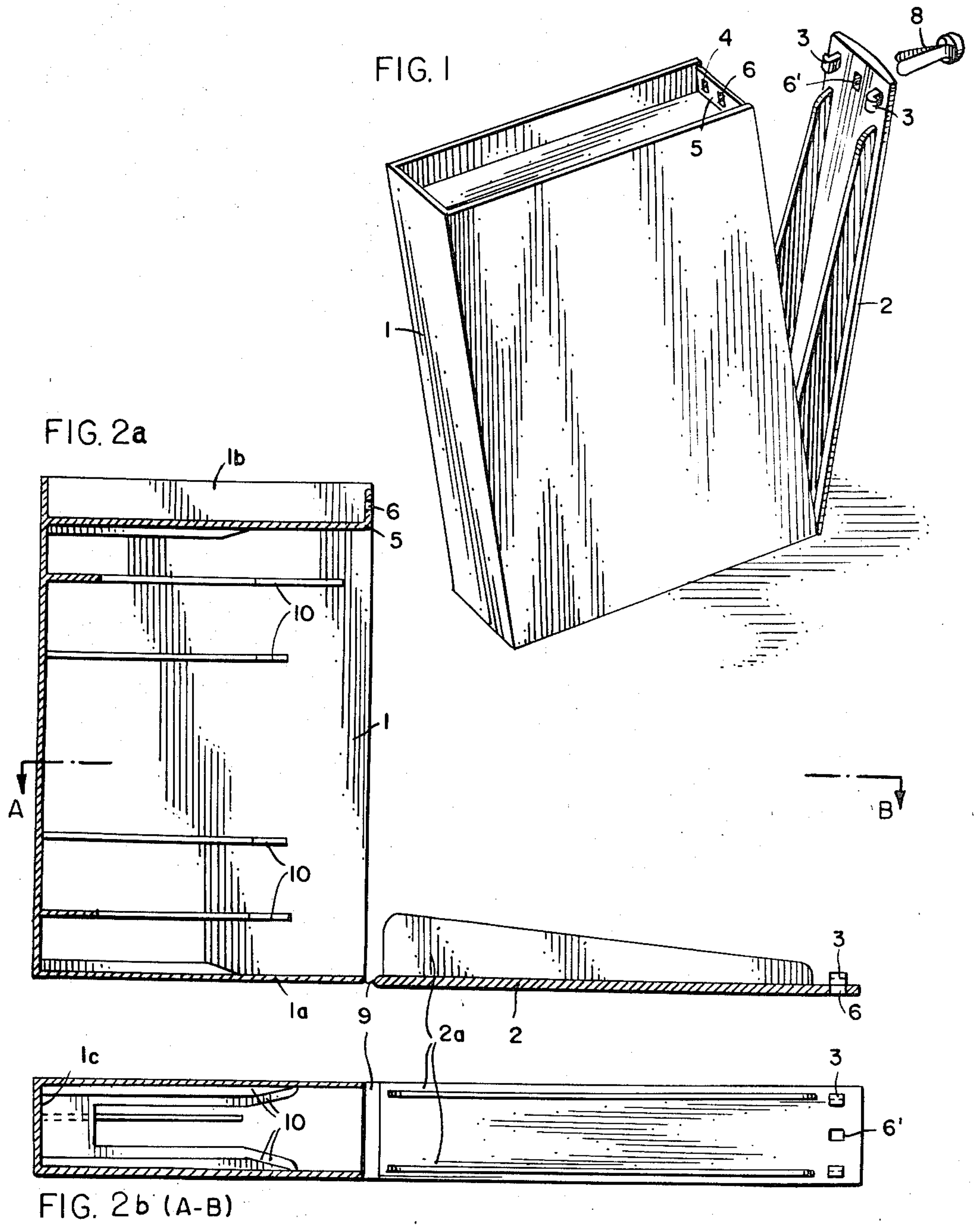
FIG. 1, FIG. 2a, FIG. 2b (A-B)
INVENTORS:
ROBERT SCHINDLER
KURT SCHMIDTS
WOLFGANG WIEGEL
BY
Johnston, Root, O'Keeffe, Keil, Thompson & Shurtleff
ATT'YS

PLASTICS BOX FOR MAGNETIC RECORDING MEDIA IN TAPE FORM, PARTICULARLY REELS OF MAGNETIC TAPE

The invention relates to a container in the form of a one-piece plastics molding serving as an archive box for magnetic recording media in tape form which, without additional packaging, can be sent by post. The box in its preferred size can be used for holding either a compact cassette or a reel of type 75 mm or 3 in. in diameter.

Conventional containers or archive boxes for reels of magnetic recording media in tape form which can be closed so that they are completely or at least satisfactorily dustproof consist of at least two separate parts, the closure component usually forming one of the narrow sides of the box-shaped container. This closure component is hingedly connected to the body by means of integral lug-like projections and corresponding openings that are provided when the moldings are produced, preferably by extrusion or injection molding, and that engage with each other when the components of the container are assembled.

It is an object of the present invention to produce by a conventional plastics molding process, preferably injection molding, in a single operation a box-shaped container comprising a body having at least five external faces, a closure component forming the sixth face, a hinge and a fastening means, and a system of ribs on the inner walls of the container, and at the same time to provide openings for the split clip usually used when sending samples by post. A further object of the invention is to design the container in such a way that the split clip or rather its bendable ends do not interfere with the orderly stacking of such containers. Yet another object of the invention is to so arrange the system of ribs of varying widths on the inside surfaces of the container that either a compact cassette or a 75 mm or 3 in. reel of tape is firmly held therebetween without any modifications being necessary.

These objects are achieved with a container having the following features in combination:

a. An integral hinge connecting the body and the closure component and formed during the production of the container.
b. One or more integral press studs arranged at the free end of the closure component whose heads, owing to the natural resilience of the material, snap into correspondingly shaped perforations in the opposite web of the body.
c. An opening in the closure component and in the web of the body adjacent to the press stud or studs and their corresponding perforations, through which openings a split clip can be inserted when the press studs have snapped into position.
d. The side opposite the base 1*a* is recessed to form a rectangular trough-shaped depression 1*b* so that the press stud or studs 3 and the split clip 8 inserted through the openings 6, 6′ are at least partially located inside this depression.

According to the invention a mold for the production of such a container is so designed that the surface for molding the base and the surface for molding the closure component connected thereto by an integral hinge are approximately in one plane, i.e. are at an angle of about 180°.

The proposed box-shaped container will be more particularly and illustratively described with reference to the drawings wherein FIG. 1 is a perspective view of an embodiment of the subject container wherein the closure component is partially open;

FIG. 2*a* is a sectional side view of the container shown in Figure 1; and

FIG. 2*b* shows a sectional view taken through line A–B of FIG. 1*a*.

FIG. 1 shows the body 1 and the hinged closure component 2 opened at an angle of about 30° so that the position of for example two press studs 3 at the free end of the closure component 2 can be seen. These studs 3 pass through corresponding perforations 4 molded into the body 1. These perforations 4 are advantageously situated in a narrow web 5 connecting the two large side walls above the aperture through which the reel of tape can be introduced into the box. There is provided in this web 5 advantageously midway between the two perforations 4 an opening 6 which faces a similar opening 6′ in the closure component 2. The openings 6 and 6′ are intended to receive the split clip 8.

The side opposite the base 1*a* upon which the box stands is advantageously recessed so that the top of the box is provided with a rectangular trough-shaped depression 1*b* which is approximately as deep as the web 5 is high. In a preferred embodiment only the three upper edges of the body 1 and the upper edge of the closure component 2 are coplanar, whereas the upper edge of the web 5 is not quite as high, so that the pulling force applied by a finger to the upper edge of the closure component causes the studs 3 to disengage themselves from the perforations 4, thus enabling the closure component 2 to be swung open. The heads of the studs 3 and the opened ends of a split clip inserted through the openings 6 and 6′ are inside the trough-shaped depression 1*b* in this arrangement so that, in transit, other mail cannot be damaged. This arrangement also enables a large number of such box-shaped containers to be neatly stacked or packed despite the presence of the heads of the studs 3 and of the split clip 8.

FIG. 2*a* shows the preferred extended position of the body 1 and the closure component 2 connected thereto by an integral hinge 9 inside the injection mold, the angle between the base 1*a* and the closure component 2 being approximately 180°. By offsetting the plane of the closure component against that of the base 1*a* of the box the most suitable thickness of the material forming the integral hinge 9 can be chosen and, moreover, easy removal of the molding from the mold is ensured.

The body 1 is provided with a number of ribs 10 arranged on at least the large inside surfaces facing each other. The ribs not only stiffen these side walls but also hold the contents of the box with a small amount of play. In a preferred embodiment that can be sent by post without additional packaging and used for storing a compact cassette or a reel of tape, ribs 10 of U shape and of different widths and lengths arranged symmetrically in pairs extend not only over the large side walls of the body 1 but also over the narrow side wall 1*c* opposite the closure component 2, as shown in Figure 2*b*. Furthermore, the inside surface of the closure component 2 is provided with preferably vertical ribs 2a extending from a point adjacent to the hinge 9 to a point near the studs 3 and the opening 6′. These ribs, which as such are conventional, guide the contents of the box prior to their removal.

In addition to the above-described position of the body and the closure component in the mold, it is possible using an injection mold to mold the closure component 2 at right angles to the base 1a. In this case, too, the thickness of the integral hinge 9 can be chosen depending on the strength of the plastics material used.

We claim:

1. A plastic container for magnetic recording media having the shape of a box consisting of pairs of rectangular parallel walls, namely, base and top walls, side walls and rear and front walls, one of the shorter edges of said front wall being hingedly deflectable about one of the shorter edges of the base wall, the container having at least the following features in combination:
   - a. said front wall and said base wall being connected by an integral hinge formed during the production of the container;
   - b. said top wall being surrounded by a web arranged normal to the surface of the top wall, whereby a rectangular trough-shaped depression is formed;
   - c. the free end of said front wall being provided with at least one integral resilient press stud which is engageable in at least one perforation provided in said normal web on the top wall;
   - d. the free end of said front wall and said web being provided with corresponding openings adjacent to said press stud and perforation; and
   - e. a split clip inserted through said corresponding openings, the opened ends of said split clip being within said trough-shaped depression.

2. A container according to claim 1 produced particularly by injection molding in a mold, wherein said base wall and said front wall connected by said integral hinge are located approximately in the same plane as the mold.

3. A container according to claim 1 produced in a mold, wherein said base wall and said front wall are arranged in planes of the mold positioned at right angles to one another.

4. A container according to claim 1, wherein pairs of ribs of different lengths and widths are formed on the inner surfaces of the side walls.

5. A container according to claim 4, wherein at least one of said pairs of ribs are arranged in a U-shape and extends over three surfaces of the adjoining walls.

* * * * *

PO-1050
(5/69)

UNITED STATES PATENT OFFICE
CERTIFICATE OF CORRECTION

Patent No. 3,685,684 Dated August 22, 1972

Inventor(s) Robert Schindler, Kurt Schmidts, Wolfgang Wiegel

It is certified that error appears in the above-identified patent and that said Letters Patent are hereby corrected as shown below:

Column 2, line 10, "A-B of FIG. $1_a$ " should read -- A-B of FIG. $2_a$ --

Signed and sealed this 26th day of December 1972.

(SEAL)
Attest:

EDWARD M.FLETCHER,JR.
Attesting Officer

ROBERT GOTTSCHALK
Commissioner of Patents